US011372594B2

(12) United States Patent
Hou et al.

(10) Patent No.: US 11,372,594 B2
(45) Date of Patent: Jun. 28, 2022

(54) METHOD AND APPARATUS FOR SCHEDULING MEMORY ACCESS REQUEST, DEVICE AND STORAGE MEDIUM

(71) Applicant: BEIJING BAIDU NETCOM SCIENCE AND TECHNOLOGY CO., LTD., Beijing (CN)

(72) Inventors: Yu Hou, Beijing (CN); Shiyong Li, Beijing (CN); Junfang Zhao, Beijing (CN); Yueji Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/209,914

(22) Filed: Mar. 23, 2021

(65) Prior Publication Data
US 2021/0208819 A1 Jul. 8, 2021

(30) Foreign Application Priority Data
Aug. 24, 2020 (CN) .......................... 202010856106.7

(51) Int. Cl.
*G06F 3/06* (2006.01)
(52) U.S. Cl.
CPC .......... *G06F 3/0659* (2013.01); *G06F 3/0604* (2013.01); *G06F 3/0647* (2013.01); *G06F 3/0653* (2013.01); *G06F 3/0676* (2013.01); *G06F 3/0679* (2013.01)
(58) Field of Classification Search
CPC .... G06F 3/0659; G06F 3/0604; G06F 3/0647; G06F 3/0653; G06F 3/0676; G06F 3/0679
See application file for complete search history.

(56) References Cited

U.S. PATENT DOCUMENTS

| 6,347,362 | B1 | 2/2002 | Schoinas et al. |
| 9,535,767 | B2 * | 1/2017 | Oshins ................ G06F 9/45504 |
| 2011/0296407 | A1 * | 12/2011 | Bhandari ................ G06F 9/455 718/1 |
| 2016/0085571 | A1 | 3/2016 | Kim et al. |
| 2018/0101486 | A1 | 4/2018 | Lu et al. |
| 2020/0073703 | A1 | 3/2020 | Guan et al. |

OTHER PUBLICATIONS

Y. Cheng, W. Chen, Z. Wang and X. Yu, "Performance-Monitoring-Based Traffic-Aware Virtual Machine Deployment on NUMA Systems," in IEEE Systems Journal, vol. 11, No. 2, pp. 973-982, Jun. 2017, doi: 10.1109/JSYST.2015.2469652. (Year: 2017).*
Extended European Search Report for European Application No. 21164675.7, dated Sep. 15, 2021, 10, pages.

* cited by examiner

*Primary Examiner* — Khoa D Doan
(74) *Attorney, Agent, or Firm* — Seed IP Law Group LLP (57) ABSTRACT

The present disclosure provides a method and apparatus for scheduling a memory access request, an electronic device and a storage medium. The method may include: acquiring monitoring data of at least one service module; determining a target service module from the at least one service module based on the monitoring data; determining a target NUMA node matching the target service module from a preset NUMA node set, based on the monitoring data; and sending a memory access request of the target service module to the target NUMA node.

15 Claims, 6 Drawing Sheets

METHOD AND APPARATUS FOR SCHEDULING MEMORY ACCESS REQUEST, DEVICE AND STORAGE MEDIUM

CROSS-REFERENCE TO RELATED APPLICATIONS

This application claims priority to Chinese Patent Application No. 202010856106.7, filed on Aug. 24, 2020, titled "Method and apparatus for scheduling memory access request, device, and storage medium," which is hereby incorporated by reference in its entirety.

TECHNICAL FIELD

The present disclosure relates to the field of computer technology, in particular to the fields of communication technology and data processing, and more particular to a method and apparatus for scheduling a memory access request, a device, and a storage medium.

BACKGROUND

Due to the limitation of hardware chip technology, the computing power of a single CPU (Central Processing Unit) tends to be saturated. Therefore, in order to acquire higher computing performance, servers tend to increase the computing performance of the serves by increasing the number of CPUs. For a high-performance server, NUMA (non-uniform memory architecture) is generally used, that is, a plurality of nodes are connected through a high-speed Internet, and each node is composed of a set of CPUs and a local memory. When the node accesses the local memory, a memory access delay is small and the performance is high; however, when accessing a remote memory, the memory access delay is relatively high, which may cause performance degradation. To this end, in order to improve system performance, when performing memory allocation, a current memory allocator needs to allocate the local memory first, and then consider the remote memory.

SUMMARY

A method and apparatus for scheduling a memory access request, a device, and a storage medium are provided.

According to a first aspect, a method for scheduling a memory access request is provided. The method includes: acquiring monitoring data of at least one service module; determining a target service module from the at least one service module based on the monitoring data; determining a target NUMA node matching the target service module from a preset NUMA node set, based on the monitoring data; and sending a memory access request of the target service module to the target NUMA node.

According to a second aspect, an apparatus for scheduling a memory access request is provided. The apparatus includes: a monitoring data acquisition unit, configured to acquire monitoring data of at least one service module; a service module determination unit, configured to determine a target service module from the at least one service module based on the monitoring data; a target node determination unit, configured to determine a target NUMA node matching the target service module from a preset NUMA node set, based on the monitoring data; and a first request scheduling unit, configured to send a memory access request of the target service module to the target NUMA node.

According to a third aspect, an electronic device is provided. The electronic device includes: at least one processor; and a memory communicatively connected to the at least one processor. The memory stores instructions executable by the at least one processor, and the instructions, when executed by the at least one processor, cause the at least one processor to perform the method according to the first aspect.

According to a fourth aspect, a non-transitory computer readable storage medium storing computer instructions is provided. The computer instructions are used to cause the computer to perform the method according to the first aspect.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution and do not constitute a limitation to the present disclosure.

DETAILED DESCRIPTION OF EMBODIMENTS

The following describes example embodiments of the present disclosure with reference to accompanying drawings, which include various details of the embodiments of the present disclosure to facilitate understanding, and should be regarded as merely examples. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
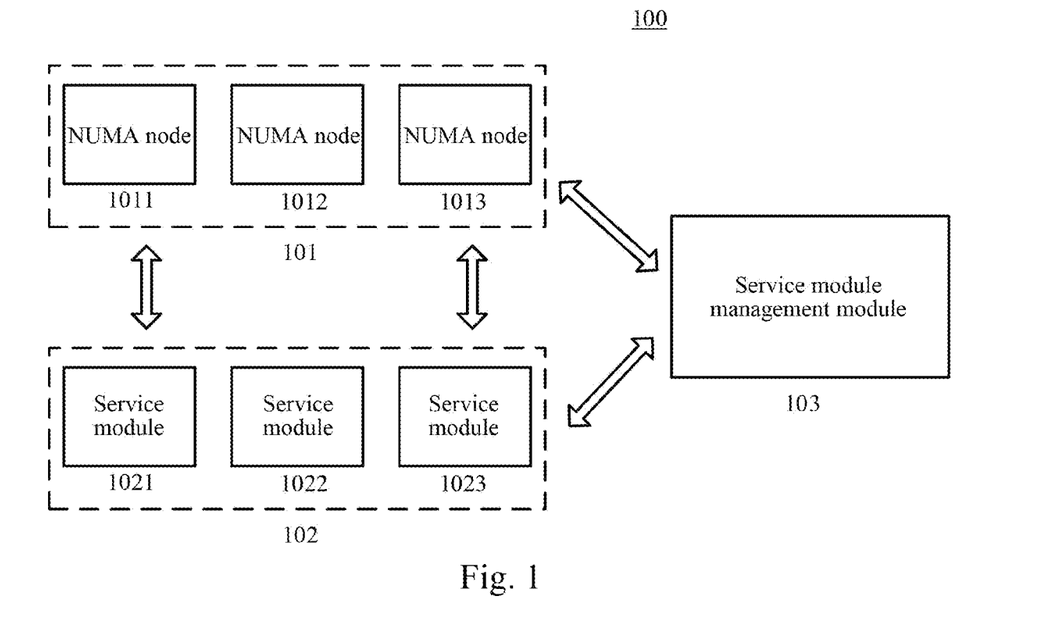
FIG. 1 is an example system architecture diagram in which embodiments of the present disclosure may be implemented.

FIG. 1 illustrates an example system architecture 100 of a method for scheduling a memory access request or an apparatus for scheduling a memory access request in which embodiments of the present disclosure may be implemented.

As shown in FIG. 1, the system architecture 100 may include a plurality of NUMA nodes 101, a plurality of service modules 102, and a service module management module 103. The plurality of NUMA nodes 101 include NUMA nodes 1011, 1012, and 1013, and the plurality of service modules 102 include service modules 1021, 1022 and 1023.

Each NUMA node in the plurality of NUMA nodes 101 may include a plurality of CPU cores, and each CPU core may correspond to a piece of memory. CPU cores in a given NUMA node may interact with each other, and CPU cores between different nodes may also interact with each other.

Each service module in the service modules 102 may be a piece of code data that performs a specific task, and the service module may access the respective NUMA nodes to perform calculations or read and write.

The service module management module 103 may acquire information of the respective service modules 102, and then manage the respective service modules 102 based on the information.

It should be noted that the plurality of NUMA nodes 101, the plurality of service modules 102, and the service module management module 103 may be set in the same server or may be set in different servers. When the plurality of NUMA nodes 101, the plurality of service modules 102, and the service module management module 103 are set in different servers, they may be distributed in a server cluster.

It should be noted that the method for scheduling a memory access request provided by the embodiments of the present disclosure is generally performed by the service module management module 103. Correspondingly, the apparatus for scheduling a memory access request is generally provided in the service module management module 103.

It should be understood that the number of NUMA nodes, service modules, and service module management modules in FIG. 1 is merely illustrative. Depending on the implementation needs, there may be any number of NUMA nodes, service modules, and service module management modules.

Figure 2:
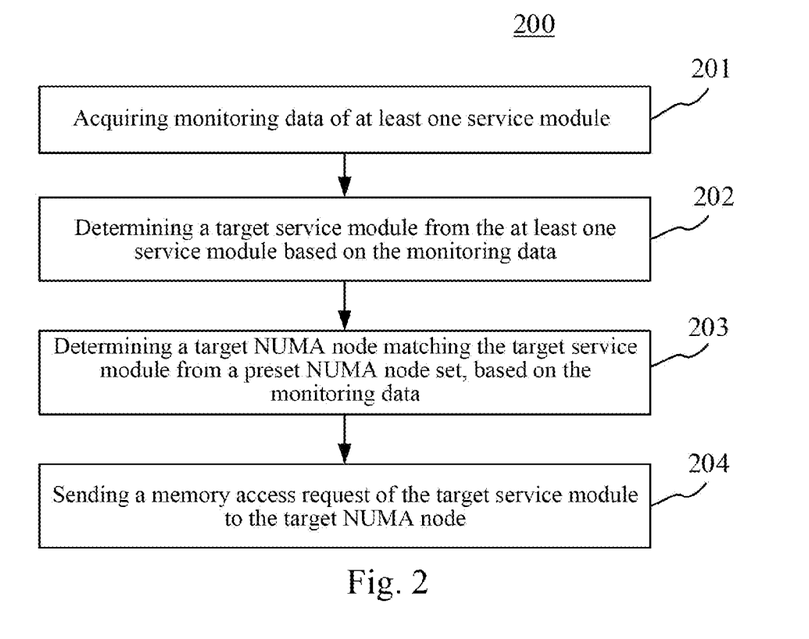
FIG. 2 is a flowchart of a method for scheduling a memory access request according to an embodiment of the present disclosure.

With further reference to FIG. 2, a flow 200 of a method for scheduling a memory access request according to of an embodiment the present disclosure is illustrated. The method for scheduling a memory access request of the present embodiment includes the following steps.

Step 201, acquiring monitoring data of at least one service module.

In the present embodiment, an executing body of the method for scheduling a memory access request (for example, the service module management module 103 shown in FIG. 1) may acquire the monitoring data of the at least one service module. Here, the service module may be a code block for performing a specific task, for example, a code block that performs specific processing on a certain parameter. It should be noted that those skilled in the art may preset each service module. a service module may need to access CPU, cache, memory, etc. in the process of processing data, which may generate certain log data, generate some parameter values, or modify some files, etc., and all these traces may be used as the monitoring data. That is, the monitoring data of the service module may be data generated by the service module in the process of processing data. The executing body may acquire the monitoring data of each service module in real time by setting a piece of code, or each service module may send the monitoring data generated by itself to the executing body in real time.

Step 202, determining a target service module from the at least one service module based on the monitoring data.

In the present embodiment, after acquiring the monitoring data of each service module, the executing body may analyze the monitoring data, and determine the target service module from the at least one service module based on the analysis result. Specifically, the executing body may extract a memory access bandwidth, the number of memory access, time waiting to access memory, a type of data stored in the memory by the service module, or data volume of different memory data types from the monitoring data, and calculate the sensitivity of each service module to a memory access delay based on these parameters. Specifically, the executing body may calculate the sensitivity of each service module to the memory access delay based on the memory access bandwidth, the time waiting to access memory, and the data volume of different memory data types. For example, the executing body may calculate a proportion of each memory data type in a vertical memory data, then multiply the memory access bandwidth, the time waiting to access memory, and the proportion, and the product obtained is used as the sensitivity of each service module to the memory access delay.

It may be understood that if a certain service module is more sensitive to the memory access delay, that is, the greater the sensitivity, the smaller an impact of the memory access delay on the performance of the service module. If a certain service module is not sensitive to the memory access delay, it means that a large memory access delay may not affect the performance of the service module. In order to ensure the performance of each service module, the executing body may use a service module that is more sensitive to the memory access delay as the target service module.

Step 203, determining a target NUMA node matching the target service module from a preset NUMA node set, based on the monitoring data.

After determining the target service module, the executing body may also determine the target NUMA node matching the target service module from the preset NUMA node set, based on the monitoring data. Specifically, the executing body may determine a NUMA node having the largest memory usage by the target service module as the target NUMA node matching the target service module. Alternatively, the executing body may determine a NUMA node with a memory occupancy rate by the target service module to the NUMA node within a preset range as the target NUMA node matching the target service module.

Step 204, sending a memory access request of the target service module to the target NUMA node.

After determining the target service module and the target NUMA node, the executing body may send the memory access request of the target service module to the target NUMA node. Since the target service module occupies the most memory of the target NUMA node in the NUMA nodes, the memory access request of the target service module is sent to the target NUMA node, then the target service module may use a CPU core of the target NUMA node to perform calculations, so that no cross-NUMA node memory access may occur, which may effectively reduce the memory access delay of the target service module.

Figure 3:
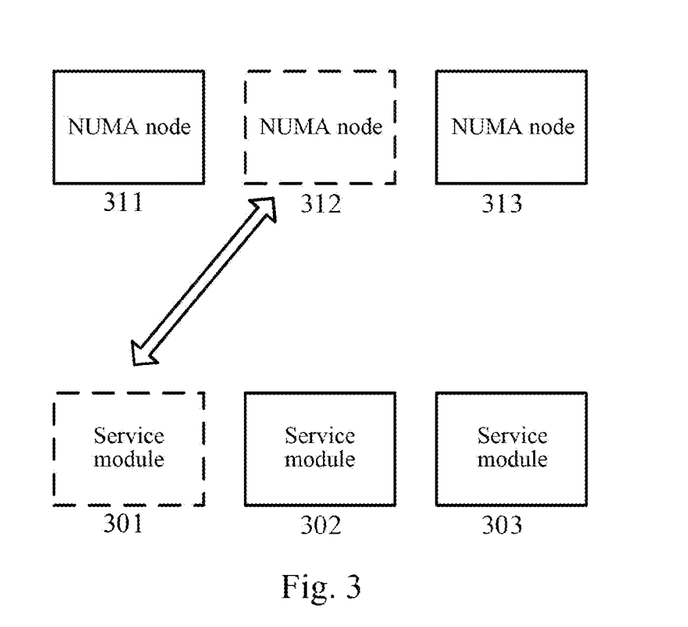
FIG. 3 is a schematic diagram of an application scenario of the method for scheduling a memory access request according to an embodiment of the present disclosure.

With further reference to FIG. 3, illustrating a schematic diagram of an application scenario of the method for scheduling a memory access request according to an embodiment of the present disclosure. In the application scenario of FIG. 3, a server includes a plurality of service modules, which are service modules 301, 302, and 303, and at the same time includes a plurality of NUMA nodes, which are NUMA nodes 311, 312, and 313, respectively. The server may acquire monitoring data of the respective service modules, then analyze the monitoring data and determine that the service module 301 is more sensitive to a memory access delay. Then, the service module 301 is determined as a target service module. At the same time, the server also analyze that the service module 301 occupies the most memory of the NUMA node 312 using the monitoring data. Then, the service module 301 is bound with the NUMA node 312, and memory access requests of the service module 301 are all sent to the NUMA node 312.

The method for scheduling a memory access request provided by the above embodiment of the present disclosure may determine a suitable service module from the service modules, and schedule the memory access request of the service module to a matching NUMA node, so as to reduce the memory access delay of the service module.

Figure 4:
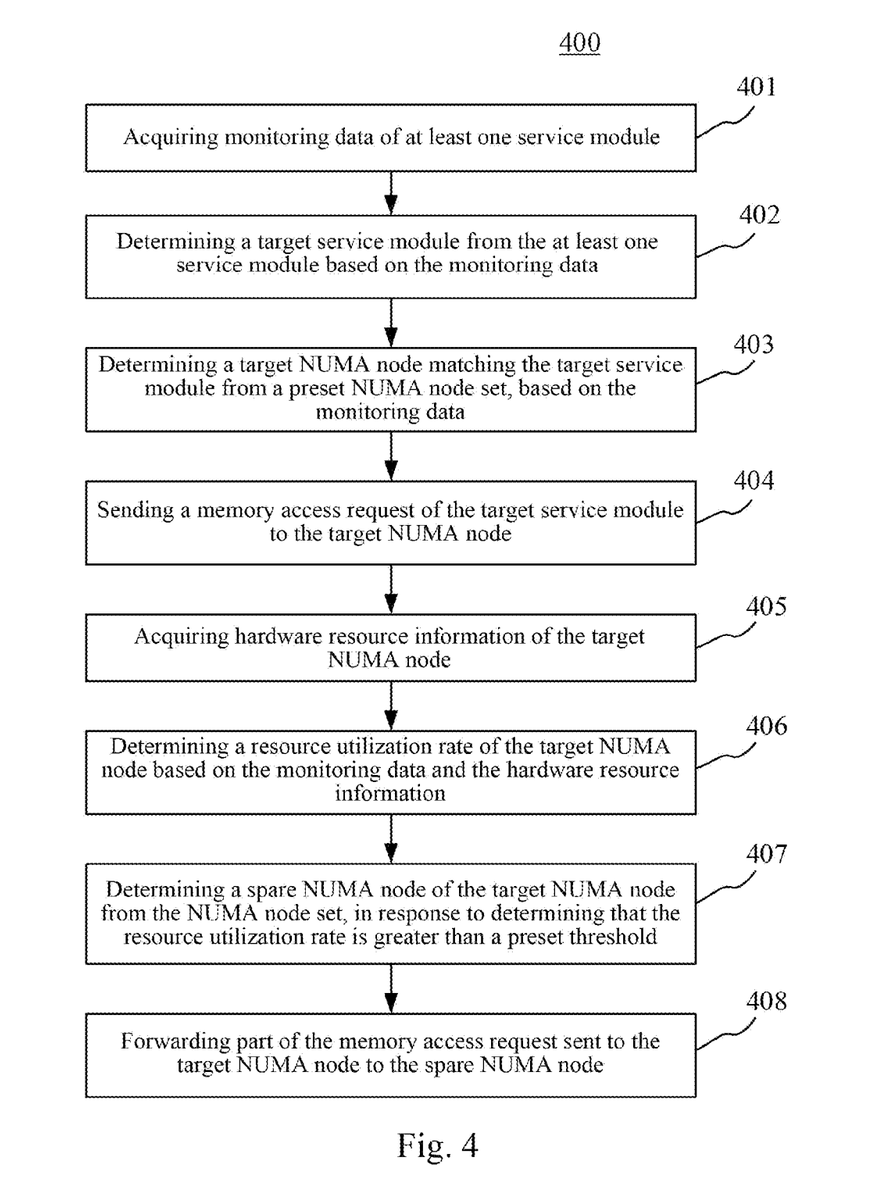
FIG. 4 is a flowchart of the method for scheduling a memory access request according to another embodiment of the present disclosure.

With further reference to FIG. 4, a flow 400 of the method for scheduling a memory access request according to another embodiment of the present disclosure is illustrated. As shown in FIG. 4, the method for scheduling a memory access request of the present embodiment may include the following steps.

Step 401, acquiring monitoring data of at least one service module.

Step 402, determining a target service module from the at least one service module based on the monitoring data.

In the present embodiment, the executing body may specifically determine the target service module through the following steps not shown in FIG. 4: determining, based on the monitoring data, at least one of: a memory access bandwidth, time waiting to access memory, time waiting to access CPU, time waiting to access cache, or data volume of different memory data types; determining a memory access delay sensitivity value of the at least one service module based on the determined information; and determining the target service module from the at least one service module, based on the memory access delay sensitivity value.

The executing body may first analyze the monitoring data and determine at least one parameter of: the number of memory access; the memory access bandwidth, the time waiting to access memory, the time waiting to access CPU, the time waiting to access cache, or a type of memory data accessed. The memory access bandwidth may be understood as an effective bandwidth when accessing memory. The type of memory data accessed may include rss memory page and cache memory page. Since a layout of the rss memory page is artificially controllable, a layout of the cache memory page is artificially uncontrollable, if a proportion of the rss memory page is larger, it indicates that there are more artificially controllable parts. The executing body may determine the memory access delay sensitivity values of the service modules based on the above determined information. Specifically, the executing body may calculate the memory access delay sensitivity value according to the following formula.

Memory access delay sensitivity value=memory access bandwidth×[time waiting to access memory/(time waiting to access memory+time waiting to access cache)]×[data volume of rss memory page/(data volume of rss memory page+data volume of cache memory page)].

Alternatively, the executing body may also calculate the memory access delay sensitivity value according to the following formula.

Memory access delay sensitivity value=number of memory access×[time waiting to access memory/(time waiting to access memory+time waiting to access cache)]×[data volume of rss memory page/(data volume of rss memory page+data volume of cache memory page)].

It may be understood that the larger the memory access delay sensitivity value, the more sensitive the service module is to the memory access delay. If the memory access delay of the service modules is appropriately reduced, the performance of the service modules may be effectively improved. Therefore, next, the executing body may determine the target service module based on the memory access delay sensitivity value. Specifically, the executing body may use a service module having a memory access delay sensitivity value greater than a preset threshold as the target service module, or use a service module having the largest memory access delay sensitivity value as the target service module.

Step 403, determining a target NUMA node matching the target service module from a preset NUMA node set, based on the monitoring data.

In the present embodiment, the executing body may specifically determine the target NUMA node through the following steps not shown in FIG. 4: determining an amount of memory occupied by the target service module in respective NUMA nodes in the NUMA node set; and determining the target NUMA node based on the memory access bandwidth and/or the amount of memory occupied by the respective NUMA nodes.

After determining the target service module, the executing body may first determine the amount of memory occupied by the target service module in the respective NUMA nodes in order to ensure that the memory access delay of the target service module is as small as possible, and determine the target NUMA node based on the memory access bandwidth of the respective NUMA nodes. For example, the executing body may determine a NUMA node having the largest amount of memory occupied by the target service module as the target NUMA node. Alternatively, the executing body may determine a NUMA node having the largest memory access bandwidth as the target NUMA node. Alternatively, the memory access bandwidth and the amount of memory occupied may be comprehensively considered and weighted, and a NUMA node may be selected as the target NUMA node based on a weighting result. In the present embodiment, the executing body may bind the target service module with the NUMA node having the largest amount of memory occupied, that is, the NUMA node having the largest amount of memory occupied is determined as the target NUMA node matching the target service module.

Step 404, sending a memory access request of the target service module to the target NUMA node.

Step 405, acquiring hardware resource information of the target NUMA node.

In the present embodiment, the executing body may also acquire the hardware resource information of the target NUMA node. The hardware resource information may be acquired using a preset hardware resource information acquisition tool, or may be obtained from a database storing metadata of the NUMA nodes. The hardware resource information may include information such as the number and configuration of CPU cores included in the NUMA node, the size of a first level cache, and so on.

Step 406, determining a resource utilization rate of the target NUMA node based on the monitoring data and the hardware resource information.

After acquiring the hardware resource information of the target NUMA node, the executing body may determine the resource utilization rate of the target NUMA node based on the monitoring data and the hardware resource information. Specifically, the executing body may determine a memory usage rate based on a memory capacity and a memory usage.

Step 407, determining a spare NUMA node of the target NUMA node from the NUMA node set, in response to determining that the resource utilization rate is greater than a preset threshold.

In the present embodiment, if the executing body determines that the resource utilization rate of the target NUMA node is greater than the preset threshold, it is considered that the hardware resource of the target NUMA node is saturated. The preset threshold may be 90%. It may be understood that the preset threshold may be a threshold set by those skilled in the art according to an actual application scenario. In the case of hardware resource saturation, the performance of the target NUMA node is determined to be poor. In this regard, the spare NUMA node of the target NUMA node may be determined from the NUMA node set, allowing the spare NUMA node to process part of the memory access request of the target service module. Specifically, the executing body may determine a NUMA node having the second largest memory occupation by the target service module in the NUMA nodes as the spare NUMA node of the target NUMA node. Alternatively, the executing body may select the spare NUMA node of the target NUMA node based on free resources of the NUMA nodes.

In some alternative implementations of the present embodiment, the executing body may specifically determine the spare NUMA node through the following steps not shown in FIG. 4: determining resource utilization rates of NUMA nodes in the NUMA node set; and determining the spare NUMA node of the target NUMA node from the NUMA node set, based on the resource utilization rates of the NUMA nodes.

In this implementation, the executing body may determine the resource utilization rates of the respective NUMA nodes. Then, based on the resource utilization rates of the respective NUMA nodes, the spare NUMA node of the target NUMA node is determined from the NUMA node set. For example, the executing body may determine a NUMA node having the lowest resource utilization rate as the spare NUMA node.

Step 408, forwarding part of the memory access request sent to the target NUMA node to the spare NUMA node.

After determining the spare NUMA node, the executing body may forward part of the memory access request sent to the target NUMA node to the spare NUMA node to reduce a processing pressure of the target NUMA node.

For example, the resource utilization rate of the target NUMA node is 95%, and the resource utilization rate of another NUMA node 1 is 50%. In order to make full use of the hardware resource of NUMA node 1, the executing body may determine NUMA node 1 as the spare NUMA node and forward 20% of the memory access request to NUMA node 1, which may improve the performance of the target NUMA node, and make full use of the hardware resource of the spare NUMA node without reducing the performance of the spare NUMA node.

The method for scheduling a memory access request provided by the above embodiment of the present disclosure may ensure that the performance of each NUMA node is in a good status, thereby ensuring the normal operation of each service module.

Figure 5:
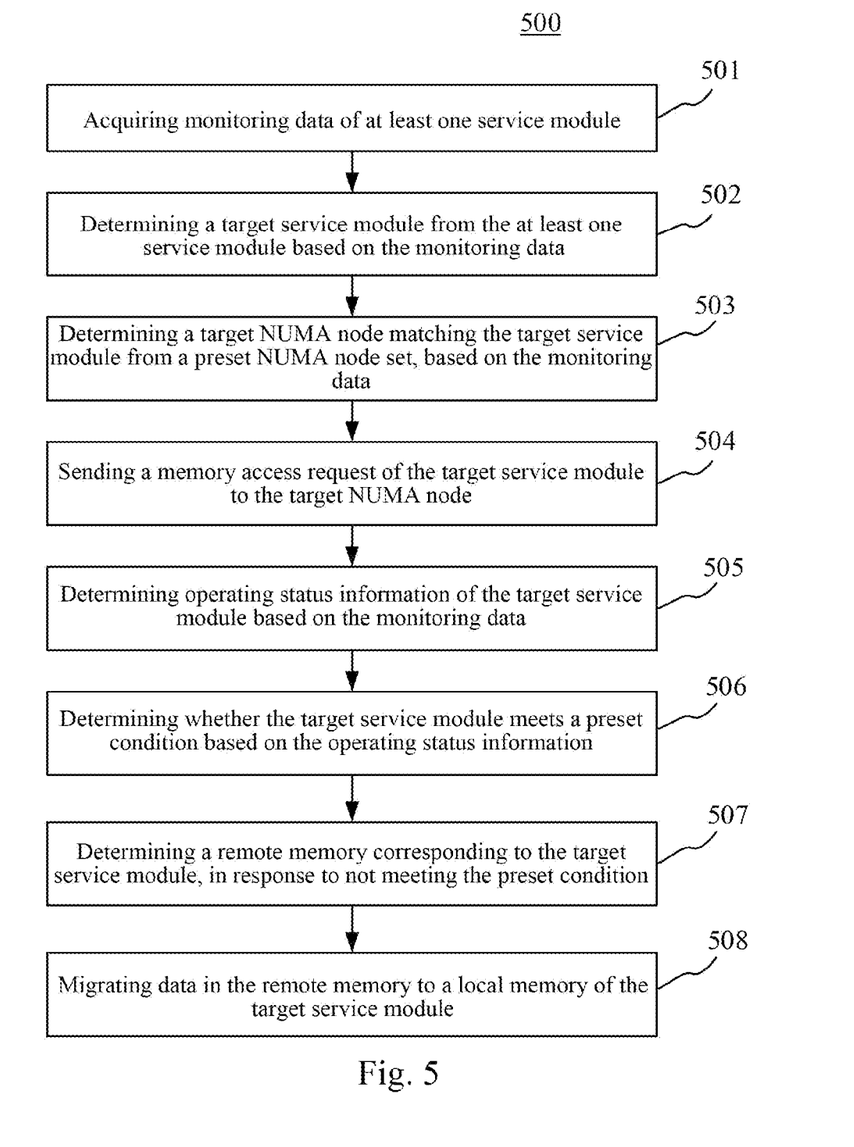
FIG. 5 is a flowchart of the method for scheduling a memory access request according to another embodiment of the present disclosure.

With further reference to FIG. 5, a flow 500 of the method for scheduling a memory access request according to another embodiment of the present disclosure is illustrated. The method for scheduling a memory access request of the present embodiment may be applied to a server cluster. As shown in FIG. 5, the method for scheduling a memory access request of the present embodiment may include the following steps.

Step 501, acquiring monitoring data of at least one service module.

Step 502, determining a target service module from the at least one service module based on the monitoring data.

Step 503, determining a target NUMA node matching the target service module from a preset NUMA node set, based on the monitoring data.

Step 504, sending a memory access request of the target service module to the target NUMA node.

Step 505, determining operating status information of the target service module based on the monitoring data.

In the present embodiment, the executing body may also determine the operating status information of the target service module based on the monitoring data. Here, the operating status information may include a plurality of parameter values, for example, may include a memory access bandwidth value, a memory utilization rate value, and so on.

Step 506, determining whether the target service module meets a preset condition based on the operating status information.

The executing body may compare the parameter values in the operating status information with a preset threshold set to determine whether the target service module meets the preset condition. Specifically, if the parameter values in the operating status information are all less than the corresponding thresholds in the threshold set, it may be determined that the target service module meets the preset condition.

Step 507, determining a remote memory corresponding to the target service module, in response to that the target service module does not meeting the preset condition.

If the target service module does not meet the preset condition, the executing body may determine the remote memory corresponding to the target service module. Specifically, the executing body may analyze a process address space layout of the target service module, sample the memory access, and identify the remote memory. Here, the remote memory is relative to a local memory. The server where the target NUMA node bound to the target service module is located is the local memory. The remote memory is memory of NUMA nodes located on other servers in the server cluster.

Step 508, migrating data in the remote memory to a local memory of the target service module.

After determining the remote memory, the executing body may migrate the data in the remote memory to the local memory of the target service module. Specifically, the executing body may migrate the data in the remote memory to the local memory of the target service module through an interface of a kernel system.

Using this method, the target service module may read content of the remote memory in the local memory and provide the operating status of the target business model.

The method for scheduling a memory access request provided in the foregoing embodiment of the present disclosure may monitor each service module and improve the performance of each service module.

Figure 6:
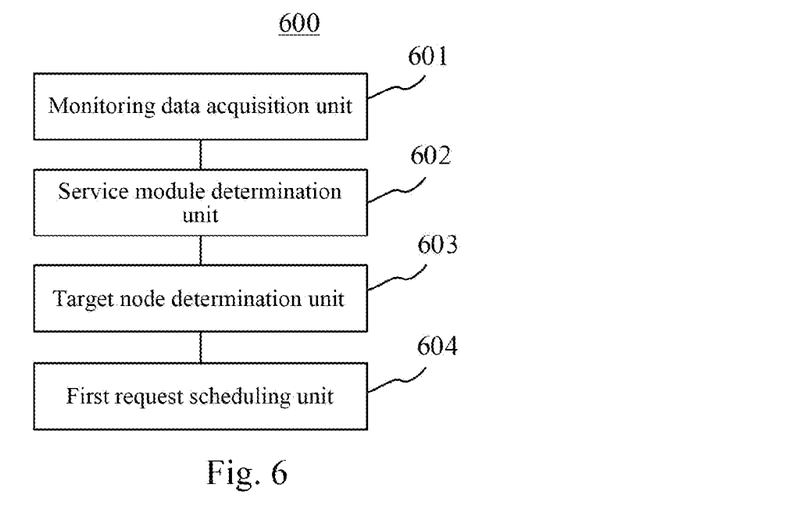
FIG. 6 is a schematic structural diagram of an apparatus for scheduling a memory access request according to an embodiment of the present disclosure.

With further reference to FIG. 6, as an implementation of the method shown in the above figures, an embodiment of the present disclosure provides an apparatus for scheduling a memory access request, and the apparatus embodiment corresponds to the method embodiment as shown in FIG. 2. The apparatus may be specifically applied to various electronic devices.

As shown in FIG. 6, an apparatus 600 for scheduling a memory access request of the present embodiment includes: a monitoring data acquisition unit 601, a service module determination unit 602, a target node determination unit 603 and a first request scheduling unit 604.

The monitoring data acquisition unit 601 is configured to acquire monitoring data of at least one service module.

The service module determination unit 602 is configured to determine a target service module from the at least one service module based on the monitoring data.

The target node determination unit 603 is configured to determine a target NUMA node matching the target service module from a preset NUMA node set, based on the monitoring data.

The first request scheduling unit 604 is configured to send a memory access request of the target service module to the target NUMA node.

In some alternative implementations of the present embodiment, the service module determination unit 602 may be further configured to: determine, based on the monitoring data, at least one of: the number of memory access, a memory access bandwidth, time waiting to access memory, time waiting to access CPU, time waiting to access cache, or data volume of different memory data types; determine a memory access delay sensitivity value of the at least one service module based on the determined information; and determine the target service module from the at least one service module, based on the memory access delay sensitivity value.

In some alternative implementations of the present embodiment, the target node determination unit 603 may be further configured to: determine an amount of memory occupied by the target service module in respective NUMA nodes in the NUMA node set; and determine the target NUMA node based on the memory access bandwidth and/or the amount of memory occupied by the respective NUMA nodes.

In some alternative implementations of the present embodiment, the apparatus 600 may further include those not shown in FIG. 6: a resource information acquisition unit, a utilization rate determination unit, a spare node determination unit and a second request scheduling unit.

The resource information acquisition unit is configured to acquire hardware resource information of the target NUMA node.

The utilization rate determination unit is configured to determine a resource utilization rate of the target NUMA node based on the monitoring data and the hardware resource information.

The spare node determination unit is configured to determine a spare NUMA node of the target NUMA node from the NUMA node set, in response to determining that the resource utilization rate is greater than a preset threshold.

The second request scheduling unit is configured to forward part of the memory access request sent to the target NUMA node to the spare NUMA node.

In some alternative implementations of the present embodiment, the spare node determination unit is further configured to: determine resource utilization rates of NUMA nodes in the NUMA node set; and determine the spare NUMA node of the target NUMA node from the NUMA node set, based on the resource utilization rates of the NUMA nodes.

In some alternative implementations of the present embodiment, the apparatus 600 may further include those not shown in FIG. 6: a status information determination unit, a judging unit, a remote memory determination unit and a data migration unit.

The status information determination unit is configured to determine operating status information of the target service module based on the monitoring data.

The judging unit is configured to determine whether the target service module meets a preset condition based on the operating status information.

The remote memory determination unit is configured to determine a remote memory corresponding to the target service module, in response to that the target service module does not meeting the preset condition.

The data migration unit is configured to migrate data in the remote memory to a local memory of the target service module.

It should be understood that the units 601 to 604 recorded in the apparatus 600 for scheduling a memory access request correspond to the steps in the method described with reference to FIG. 2 respectively. Therefore, the operations and features described above for the method for scheduling a memory access request are also applicable to the apparatus 600 and the units included therein, and detailed description thereof will be omitted.

According to an embodiment of the present disclosure, the present disclosure further provides an electronic device and a readable storage medium.

Figure 7:
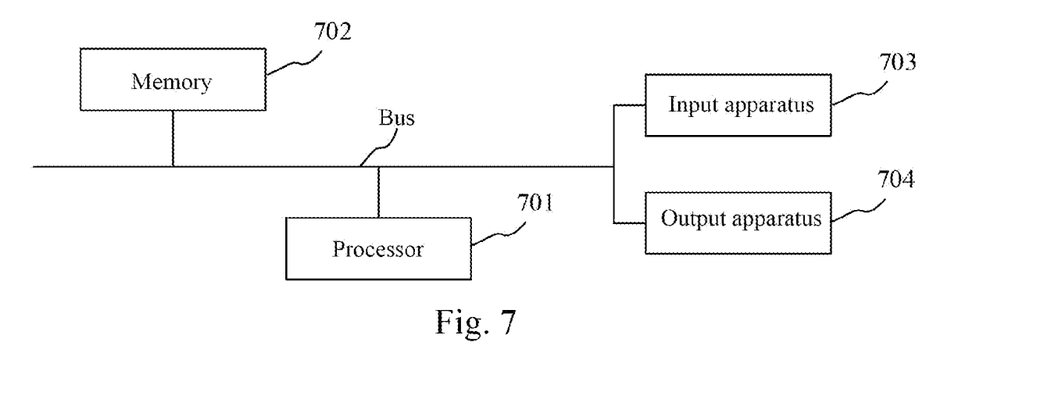
FIG. 7 is a block diagram of an electronic device used to implement the method for scheduling a memory access request according to embodiments of the present disclosure.

As shown in FIG. 7, is a block diagram of an electronic device of the method for scheduling a memory access request according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 7, one processor 701 is used as an example.

The memory 702 is a non-transitory computer readable storage medium provided by the present disclosure. The memory stores instructions executable by at least one processor, so that the at least one processor performs the method for scheduling a memory access request provided by the present disclosure. The non-transitory computer readable storage medium of the present disclosure stores computer instructions for causing a computer to perform the method for scheduling a memory access request provided by the present disclosure.

The memory 702, as a non-transitory computer readable storage medium, may be used to store non-transitory software programs, non-transitory computer executable programs and modules, such as program instructions/modules corresponding to the method for scheduling a memory access request in the embodiments of the present disclosure (for example, the monitoring data acquisition unit 601, the service module determination unit 602, the target node determination unit 603 and the first request scheduling unit 604 as shown in FIG. 6). The processor 701 executes the non-transitory software programs, instructions, and modules stored in the memory 702 to execute various functional applications and data processing of the server, that is, to implement the method for scheduling a memory access request in the foregoing method embodiments.

The memory 702 may include a storage program area and a storage data area, where the storage program area may store an operating system and at least one function required application program; and the storage data area may store data created by the use of the electronic device according to the method for scheduling a memory access request, etc. In addition, the memory 602 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device of the method for scheduling a memory access request through a network. Examples of the above network include but are not limited to the Internet, intranet, local area network, mobile communication network, and combinations thereof.

The electronic device of the method for scheduling a memory access request may further include: an input apparatus 703 and an output apparatus 704. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and function control of the electronic device of the method for scheduling a memory access request, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof.

These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, a suitable service module may be determined from the service modules, and the memory access request of the service module is scheduled to a matching NUMA node, so as to reduce the memory access delay of the service module.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for scheduling a memory access request, the method comprising:
   acquiring monitoring data of at least one service module;
   determining a target service module from the at least one service module based on the monitoring data;
   determining a target Non-Uniform Memory Architecture (NUMA) node matching the target service module from a preset NUMA node set, based on the monitoring data; and
   sending a memory access request of the target service module to the target NUMA node;
   wherein the determining a target NUMA node matching the target service module from a preset NUMA node set, based on the monitoring data, comprises:
   determining an amount of memory occupied by the target service module in respective NUMA nodes in the NUMA node set; and
   determining the target NUMA node based on a memory access bandwidth and/or the amount of memory occupied by the respective NUMA nodes.

2. The method according to claim 1, wherein the determining a target service module from the at least one service module based on the monitoring data, comprises:
   determining, based on the monitoring data, at least one of: a number of memory access, the memory access bandwidth, time waiting to access memory, time waiting to access CPU, time waiting to access cache, or data volume of different memory data types;
   determining a memory access delay sensitivity value of the at least one service module based on the determined information; and
   determining the target service module from the at least one service module, based on the memory access delay sensitivity value.

3. The method according to claim 1, wherein the method further comprises:
   acquiring hardware resource information of the target NUMA node;
   determining a resource utilization rate of the target NUMA node based on the monitoring data and the hardware resource information;
   determining a spare NUMA node of the target NUMA node from the NUMA node set, in response to determining that the resource utilization rate is greater than a preset threshold; and
   forwarding part of the memory access request sent to the target NUMA node to the spare NUMA node.

4. The method according to claim 3, wherein the determining a spare NUMA node of the target NUMA node from the NUMA node set, comprises:
   determining resource utilization rates of NUMA nodes in the NUMA node set; and
   determining the spare NUMA node of the target NUMA node from the NUMA node set, based on the resource utilization rates of the NUMA nodes.

5. The method according to claim 1, wherein the method further comprises:
   determining operating status information of the target service module based on the monitoring data;
   determining whether the target service module meets a preset condition based on the operating status information;
   determining a remote memory corresponding to the target service module, in response to that the target service module does not meet the preset condition; and
   migrating data in the remote memory to a local memory of the target service module.

6. An electronic device for scheduling a memory access request, comprising:
   at least one processor; and
   a memory communicatively connected to the at least one processor;
   wherein the memory stores instructions executable by the at least one processor, and the instructions, when executed by the at least one processor, cause the at least one processor to perform operations, comprising:
   acquiring monitoring data of at least one service module;
   determining a target service module from the at least one service module based on the monitoring data;
   determining a target Non-Uniform Memory Architecture (NUMA) node matching the target service module from a preset NUMA node set, based on the monitoring data; and
   sending a memory access request of the target service module to the target NUMA node;
   wherein the determining a target NUMA node matching the target service module from a preset NUMA node set, based on the monitoring data, comprises:
   determining an amount of memory occupied by the target service module in respective NUMA nodes in the NUMA node set; and
   determining the target NUMA node based on a memory access bandwidth and/or the amount of memory occupied by the respective NUMA nodes.

7. The electronic device according to claim 6, wherein the determining a target service module from the at least one service module based on the monitoring data, comprises:
   determining, based on the monitoring data, at least one of: a number of memory access, the memory access bandwidth, time waiting to access memory, time waiting to access CPU, time waiting to access cache, or data volume of different memory data types;
   determining a memory access delay sensitivity value of the at least one service module based on the determined information; and
   determining the target service module from the at least one service module, based on the memory access delay sensitivity value.

8. The electronic device according to claim 6, wherein the operations further comprise:
   acquiring hardware resource information of the target NUMA node;

determining a resource utilization rate of the target NUMA node based on the monitoring data and the hardware resource information;

determining a spare NUMA node of the target NUMA node from the NUMA node set, in response to determining that the resource utilization rate is greater than a preset threshold; and forwarding part of the memory access request sent to the target NUMA node to the spare NUMA node.

9. The electronic device according to claim 8, wherein the determining a spare NUMA node of the target NUMA node from the NUMA node set, comprises:

determining resource utilization rates of NUMA nodes in the NUMA node set; and determining the spare NUMA node of the target NUMA node from the NUMA node set, based on the resource utilization rates of the NUMA nodes.

10. The electronic device according to claim 6, wherein the operations further comprise:

determining operating status information of the target service module based on the monitoring data;

determining whether the target service module meets a preset condition based on the operating status information;

determining a remote memory corresponding to the target service module, in response to that the target service module does not meet the preset condition; and migrating data in the remote memory to a local memory of the target service module.

11. A non-transitory computer readable storage medium, storing computer instructions, wherein the computer instructions are used to cause the computer to perform operations, comprising:

acquiring monitoring data of at least one service module;

determining a target service module from the at least one service module based on the monitoring data;

determining a target Non-Uniform Memory Architecture (NUMA) node matching the target service module from a preset NUMA node set, based on the monitoring data; and sending a memory access request of the target service module to the target NUMA node;

wherein the determining a target NUMA node matching the target service module from a preset NUMA node set, based on the monitoring data, comprises:

determining an amount of memory occupied by the target service module in respective NUMA nodes in the NUMA node set; and determining the target NUMA node based on a memory access bandwidth and/or the amount of memory occupied by the respective NUMA nodes.

12. The non-transitory computer readable storage medium according to claim 11, wherein the determining a target service module from the at least one service module based on the monitoring data, comprises:

determining, based on the monitoring data, at least one of: a number of memory access, the memory access bandwidth, time waiting to access memory, time waiting to access CPU, time waiting to access cache, or data volume of different memory data types;

determining a memory access delay sensitivity value of the at least one service module based on the determined information; and determining the target service module from the at least one service module, based on the memory access delay sensitivity value.

13. The non-transitory computer readable storage medium according to claim 11, wherein the operations further comprise:

acquiring hardware resource information of the target NUMA node;

determining a resource utilization rate of the target NUMA node based on the monitoring data and the hardware resource information;

determining a spare NUMA node of the target NUMA node from the NUMA node set, in response to determining that the resource utilization rate is greater than a preset threshold; and forwarding part of the memory access request sent to the target NUMA node to the spare NUMA node.

14. The non-transitory computer readable storage medium according to claim 13, wherein the determining a spare NUMA node of the target NUMA node from the NUMA node set, comprises:

determining resource utilization rates of NUMA nodes in the NUMA node set; and determining the spare NUMA node of the target NUMA node from the NUMA node set, based on the resource utilization rates of the NUMA nodes.

15. The non-transitory computer readable storage medium according to claim 11, wherein the operations further comprise:

determining operating status information of the target service module based on the monitoring data;

determining whether the target service module meets a preset condition based on the operating status information;

determining a remote memory corresponding to the target service module, in response to that the target service module does not meet the preset condition; and migrating data in the remote memory to a local memory of the target service module.

* * * * *